United States Patent [19]
Brewer

[11] Patent Number: 6,139,104
[45] Date of Patent: Oct. 31, 2000

[54] MULTIPLE FUNCTION SEAT BACK ADJUSTING MECHANISM

[75] Inventor: William Shawn Brewer, Pinckney, Mich.

[73] Assignee: Johnson Controls Technology Company, Plymouth, Mich.

[21] Appl. No.: 09/240,300

[22] Filed: Jan. 29, 1999

[51] Int. Cl.⁷ ....................................................... B60N 2/02
[52] U.S. Cl. ......................... 297/353; 297/341; 297/367; 297/378.12
[58] Field of Search ..................................... 297/353, 367, 297/378.1, 378.12, 366, 368, 369, 452.2, 452.18, 483

[56] References Cited

U.S. PATENT DOCUMENTS

| | | |
|---|---|---|
| 4,627,656 | 12/1986 | Gokimoto et al. . |
| 4,629,252 | 12/1986 | Myers et al. . |
| 4,634,180 | 1/1987 | Zaveri et al. . |
| 5,028,091 | 7/1991 | Zaveri . |
| 5,161,856 | 11/1992 | Nishino . |
| 5,310,247 | 5/1994 | Fujimori et al. . |
| 5,383,710 | 1/1995 | Premji .................... 297/378.12 |
| 5,482,349 | 1/1996 | Richter et al. . |
| 5,522,643 | 6/1996 | Matsuura . |
| 5,690,386 | 11/1997 | Chabanne . |

*Primary Examiner*—Peter M. Cuomo
*Assistant Examiner*—Stephen Vu
*Attorney, Agent, or Firm*—Harness, Dickey & Pierce, P.L.C.

[57] ABSTRACT

An adjusting mechanism for a vehicle seat back provides for recliner adjustment of the seat back, rotation of the seat back to a forward dump easy entry position and rotation of the seat back to a fold flat position for storage. In the fold flat position, the seat back is locked in place. A single actuating handle is operated to adjust the recline position of the seat and to rotate the seat back to the fold flat position. A second handle is actuated to rotate the seat back to the forward dump position in which the seat back is unlocked. Upon return of the seat back from the dump position, the seat back locks in the previously adjusted recline position. A lock out is provided to prevent release of the recliner when the seat back is in the forward dump position.

28 Claims, 6 Drawing Sheets

MULTIPLE FUNCTION SEAT BACK ADJUSTING MECHANISM

BACKGROUND OF THE INVENTION

The present invention relates to a multiple function seat back adjusting mechanism for a vehicle seat which enables the seat back to be reclined to a variety of adjusted positions, dumped forward to an easy entry position and rotated to a fold flat position via single, multiple function seat back adjusting mechanism.

Various vehicle seats have been developed with seat back adjusting mechanisms that provide for the reclining angle of the seat back to be adjusted, provide for rotation of the seat back to a forward dump position for easy entry to the area of the vehicle behind the seat assembly and which provide for rotation of the seat back to a substantially flat position over the seat bottom for storage of the seat within the vehicle or for storage of the seat when removed from the vehicle. Many of these seats, however, suffer from having multiple actuating handles and levers to operate the adjustment mechanism. In addition, one or more of the adjustments can be actuated at an inappropriate time given the current position of seat back resulting in inadvertent lock up of the adjusting mechanism or even damage to the mechanism.

Accordingly, it is an object of the present invention to provide a simplified multiple function seat back adjusting mechanism that overcomes the disadvantages of the prior art devices.

It is a feature of the present invention to provide an adjusting mechanism with a lock out to prevent the recliner from being released when the seat back is in the forward dump position.

It is a feature of the adjusting mechanism of the present invention that the seat back can be dumped to a forward easy entry position in which the seat back is not locked so that the seat can be returned to its normal upright position by simply lifting the seat back without first actuating the adjusting mechanism.

Another feature of the adjusting mechanism of the present invention is that the seat back is locked when in a fold flat position to facilitate removal of the seat from the vehicle.

It is yet another advantage of the present invention that the seat back adjusting mechanism provides the above features and functions with fewer components than many of the prior art seat back adjusting mechanisms.

SUMMARY OF THE INVENTION

The seat back adjusting mechanism of the present invention includes a mounting member coupled to the horizontal seat bottom, an intermediate arm rotatably coupled to the mounting member by a primary pivot and an upper arm rotatably coupled to the intermediate arm by a secondary pivot. The seat back is attached to the upper arm for rotation relative to the mounting member about either the primary pivot or the secondary pivot. A recliner is operatively associated with the mounting member and the intermediate arm to hold the intermediate arm in one of a variety of adjusted, reclined positions about the primary pivot. The recliner is coupled to the intermediate arm by a dump latch. When the dump latch is released, the intermediate arm is free to rotate forward about the primary pivot to a forward dumped easy entry position to facilitate access to the area within a motor vehicle behind the seat. The recliner stays in its adjusted position when the seat back is dumped forward.

An upper arm latch is provided to hold the upper arm in a fixed position relative to the intermediate arm. When the upper arm latch is released, the upper arm and the seat back rotate about the secondary pivot to a generally horizontal fold flat stowed position over the seat bottom. The fold flat position of the seat back facilitates carrying of cargo within the vehicle and reduces the size of the seat for removal of the seat from the vehicle. A release linkage is provided between a recliner release pivot and the upper arm latch to release the upper arm latch via actuation of the recliner release pivot. The upper arm latch is released as the seat back rotates to the foremost recline position. Once the seat back rotates forward to the foremost recline position, the upper latch is released, allowing the seat back to continue forward rotation about the secondary pivot to the fold flat position. In the fold flat position, the upper arm latch reengages with the upper arm to lock the upper arm in the fold flat position. The recliner release pivot is subsequently actuated to again release the upper arm latch to enable return of the seat back rearward to the foremost recline position. The upper arm latch then reengages to hold the upper arm in position about the secondary pivot and the recliner is reengaged to hold the intermediate arm in a fixed position about the primary pivot.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
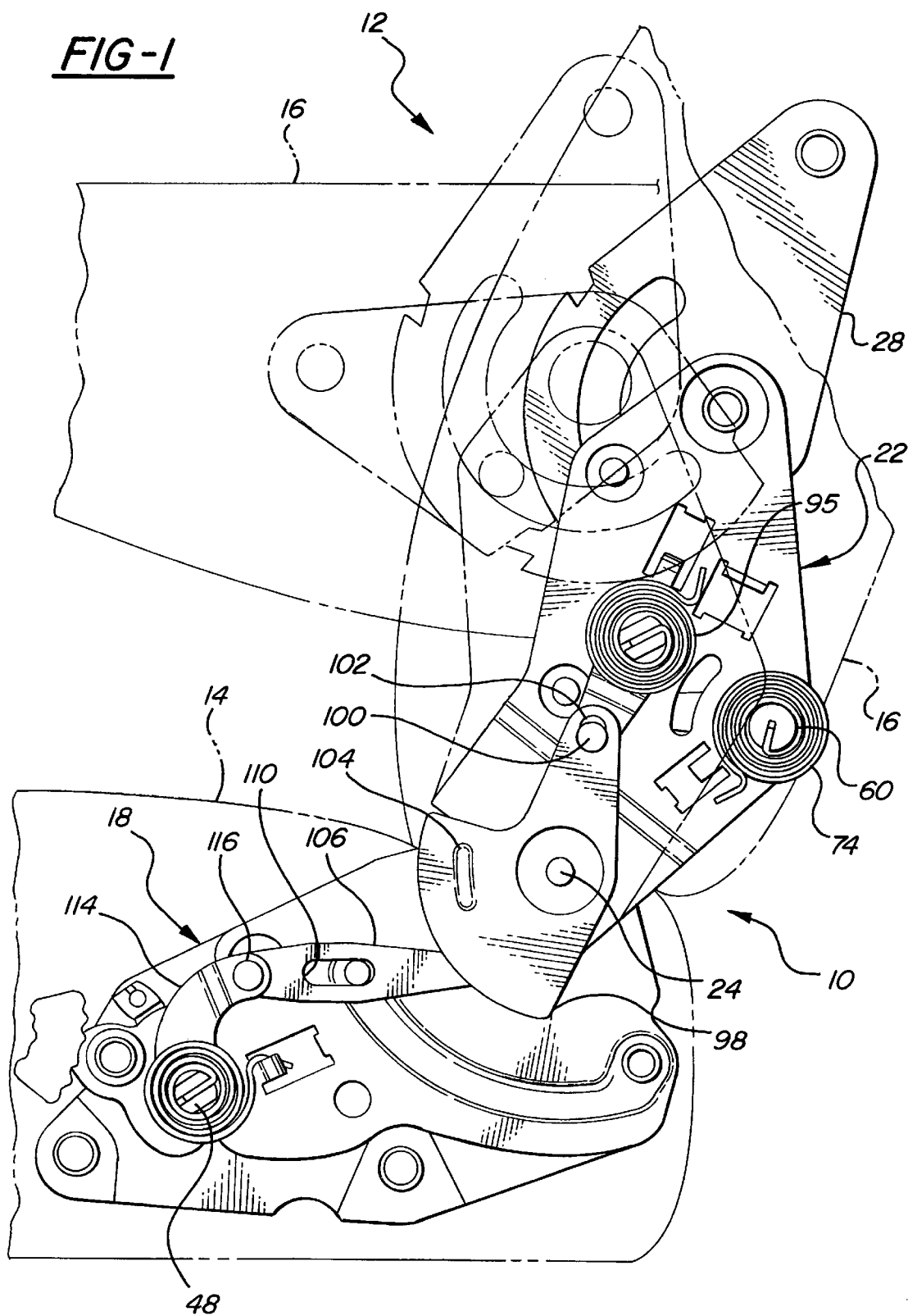
FIG. 1 is side elevation view of the multiple function seat back adjusting mechanism of the present invention showing the seat back in various positions.

The multiple function seat back adjusting mechanism of the present invention is shown in the figures and designated generally at 10. The adjusting mechanism 10 is shown in FIG. 1 in connection with a seat 12. The seat 12 includes a lower, generally horizontal seat bottom 14 and a seat back 16 extending upwardly at the rear end of the seat bottom 14. The seat back 16 is shown in FIG. 1 in an upright use position within a range of recline positions and in a fold flat position in which the seat back 16 extends forward in a generally horizontal orientation.

Figure 2:
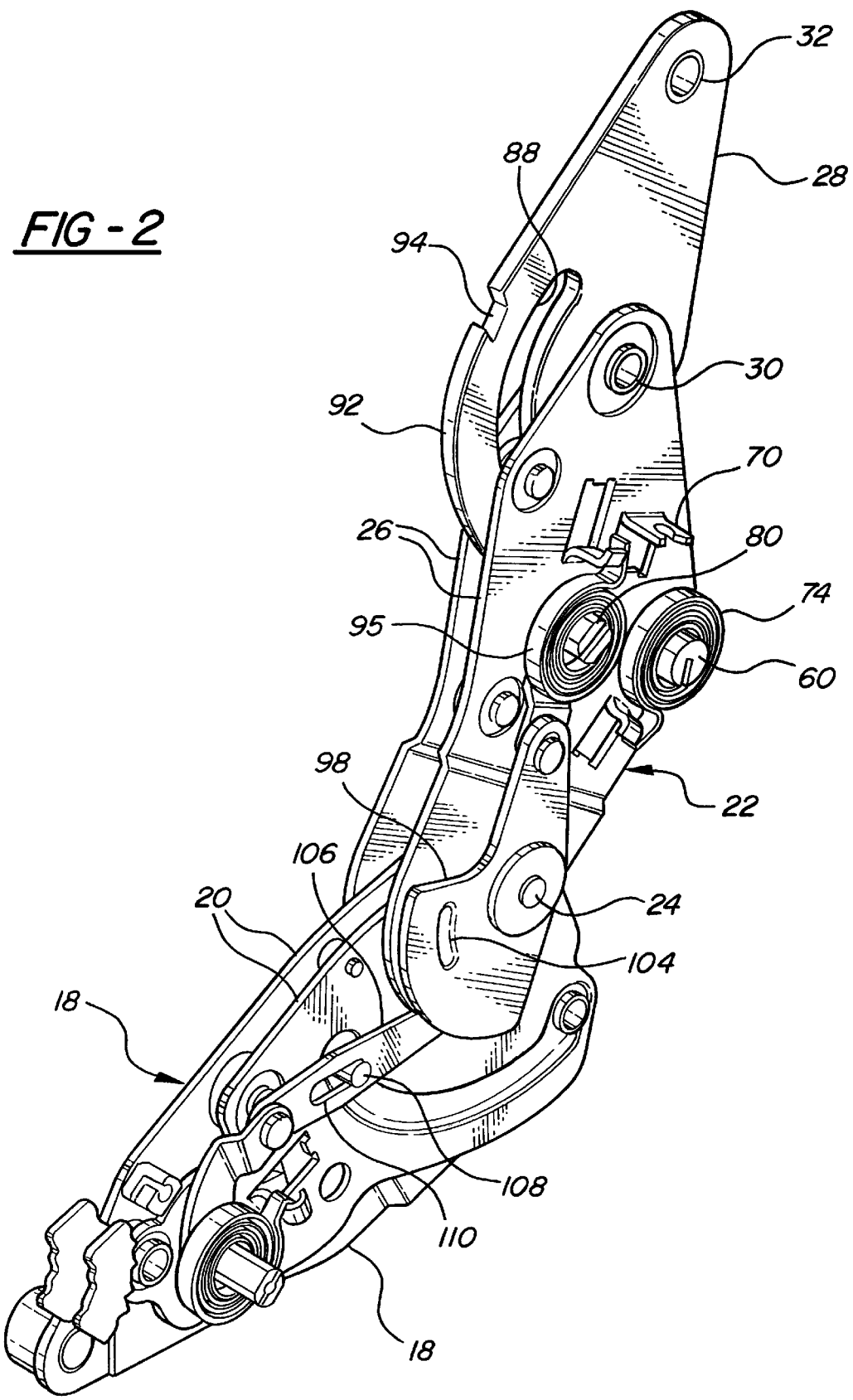
FIG. 2 is perspective view of the adjusting mechanism of the present invention shown in FIG. 1.

The adjusting mechanism 10 includes a mounting member 18 which is fixed to the seat bottom 14 and/or to the lower seat frame. The mounting member 18, as shown in FIG. 2, is formed by a pair of spaced plates 20. An intermediate arm 22 is rotatably coupled to the mounting member 18 by a primary pivot 24. The intermediate arm 22 is also formed by a pair of spaced plates 26 as shown in FIG. 2. An upper arm 28 is rotatably mounted to the intermediate arm 22 by a secondary pivot 30. The upper arm 28 is in the form of a single plate disposed between the two plates 26 of the intermediate arm 22. The seat back 16 is fixed to the upper arm 28 by a fastener disposed through an aperture 32 at the upper end of the upper arm 28. A spring (not shown) biases the intermediate arm 22 to a forward rotational position about the primary pivot 24 in a conventional manner for a reclining seat back. There is no biasing means for the upper arm 28 at the secondary pivot 30.

Figure 3:
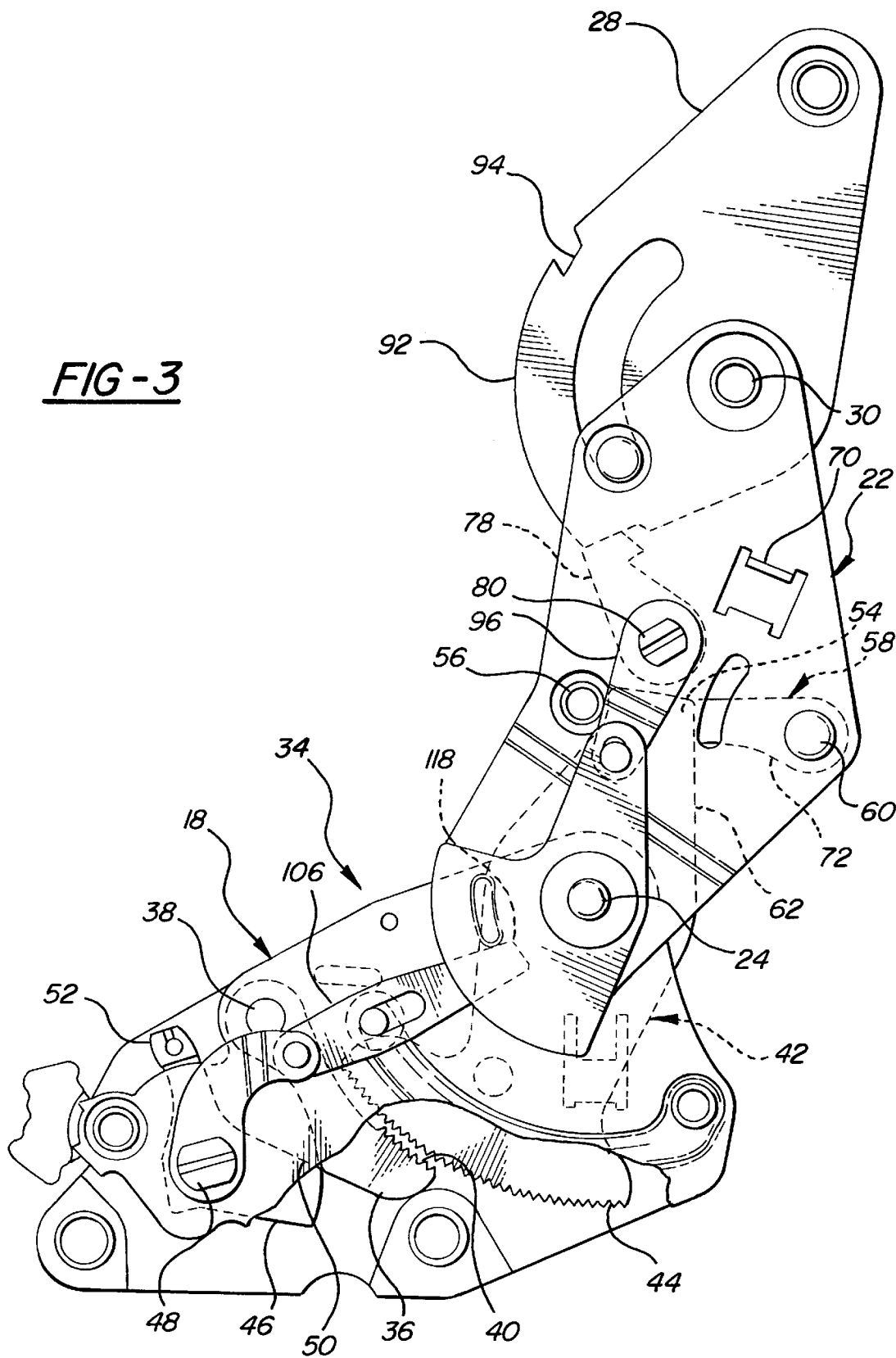
FIG. 3 is a side view of the adjusting mechanism of the present invention with the recliner released and the seat back rotated forward near the foremost recline position.
Figure 4:
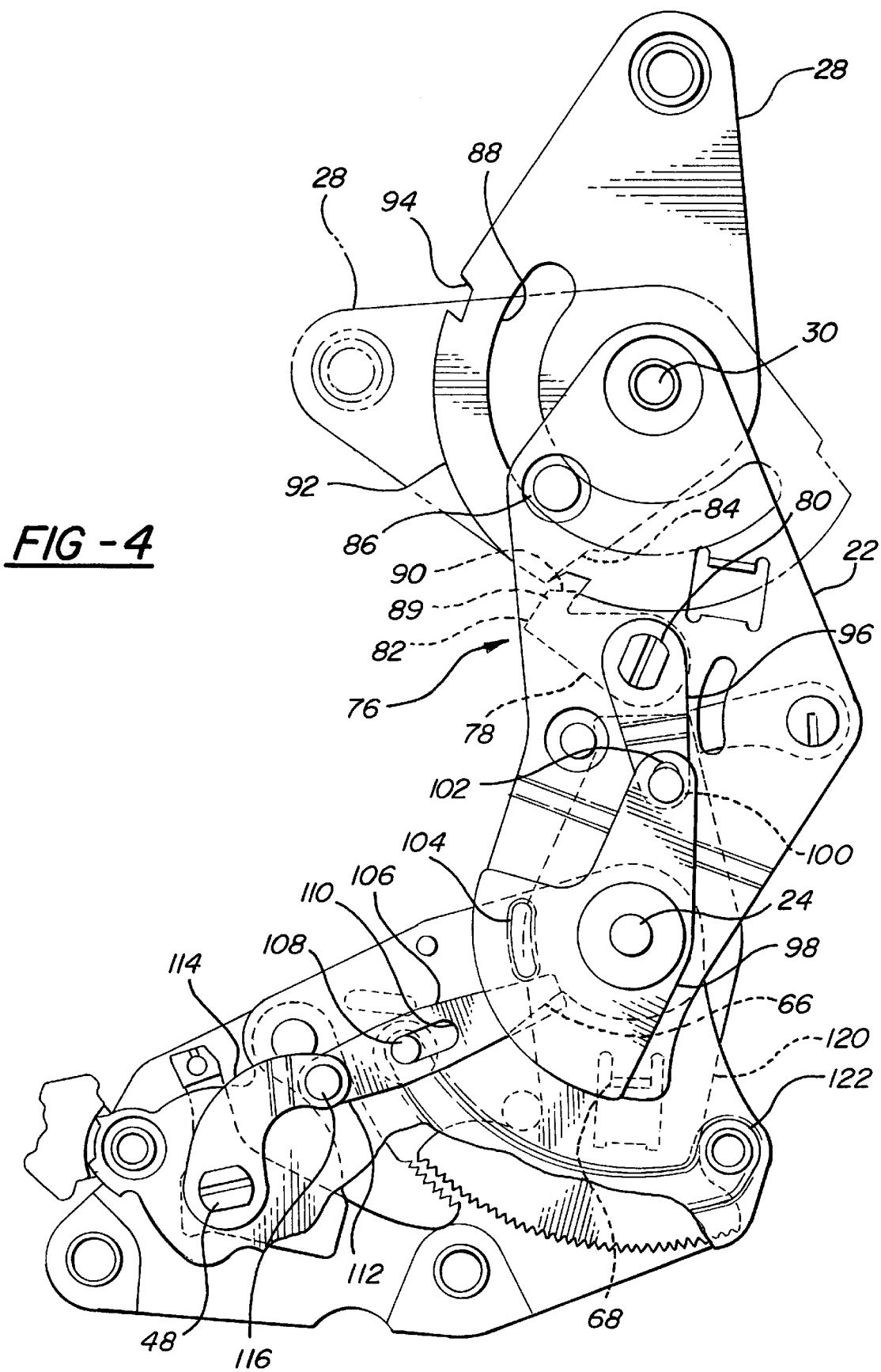
FIG. 4 is a side view of the seat back adjusting mechanism of the present invention showing the seat back in the foremost recline position and the upper arm latch released.
Figure 5:
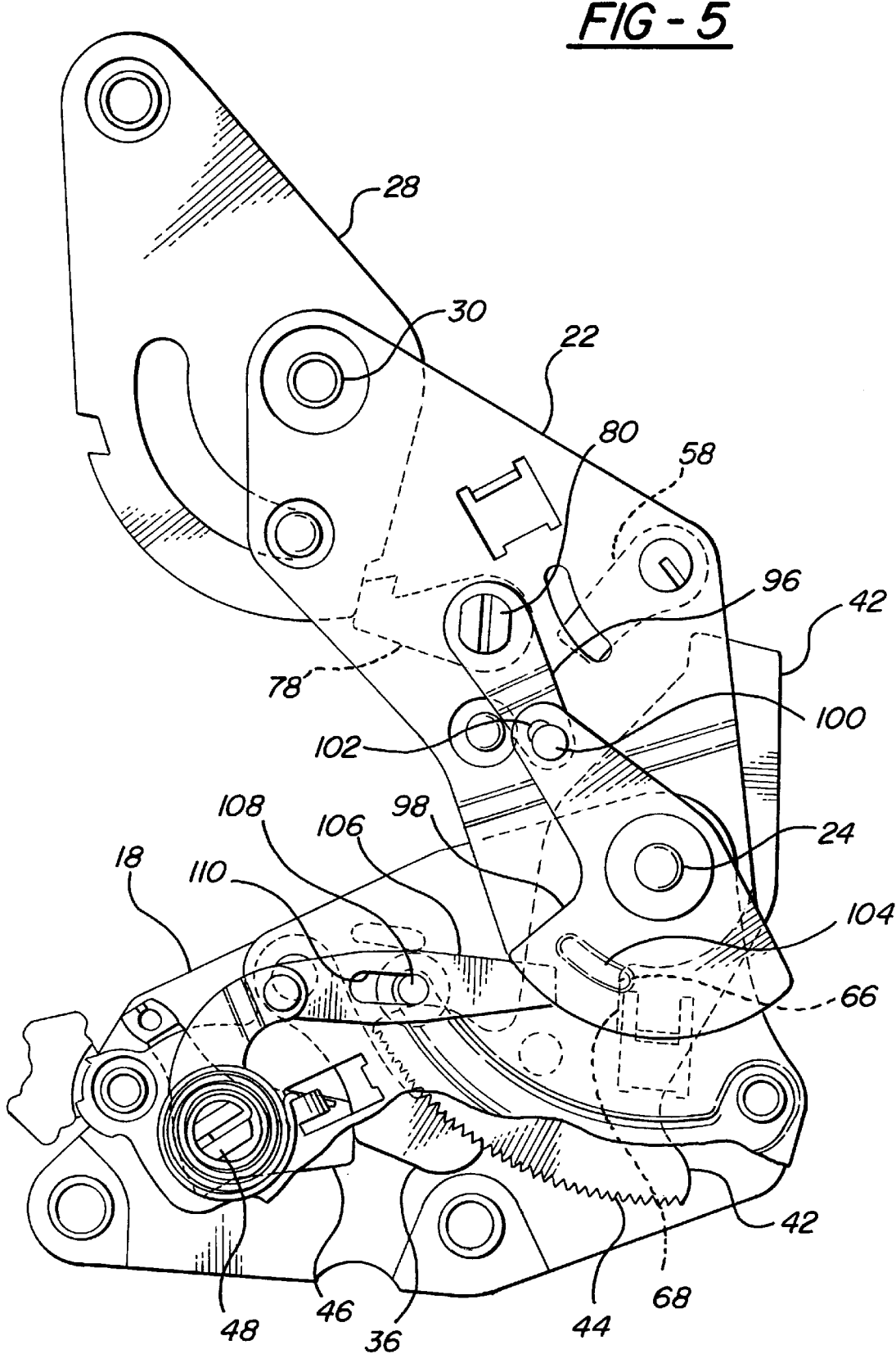
FIG. 5 is a side view of the seat back adjusting mechanism of the present invention with the seat back in a forward dump easy entry position.

With reference to FIG. 3, a recliner 34 is shown which operates to lock the intermediate arm 22 in a fixed position about the primary pivot 24 within a range of recline positions. The recliner 34 includes a lock-lower in the form of a pawl 36. The pawl 36 is rotatably mounted to the mounting member 18 by a pivot 38. One edge of the pawl 36 is formed with an arcuate array of teeth 40. The recliner 34 further includes a lock-upper in the form of a sector 42 coupled to the intermediate arm 22 as described below. The sector 42 has an arcuate lower edge with an array of teeth 44. When the seat back recline position is adjusted, the sector 42 rotates about the primary pivot 24 with the intermediate arm 22. In FIGS. 3 and 4, the pawl 36 is shown in a released position in which the pawl teeth 40 are disengaged from the sector teeth 44. In FIG. 5, the pawl 36 is shown in a lock position in which the pawl teeth 40 engage the sector teeth 44, preventing rotation of the sector 42 about the primary pivot 24. A recliner cam 46 is rotatably mounted to the mounting member 18 by a recliner release pivot 48. The cam 46 is shown in a release position in FIGS. 3 and 4 in which it extends in an approximately four o'clock position from the recliner release pivot 48. In FIG. 5, the cam 46 is shown in a lock position in which it engages an edge surface 50 of the pawl 36, opposite the teeth 40. When the cam 46 is engaged with the edge surface 50 of the pawl, it holds the pawl teeth 40 in engagement with the sector teeth 44 to prevent rotation of the sector 42 about the primary pivot 24. A recliner actuating handle (not shown) is attached to the pivot 48. This rotates the cam 46 clockwise about the recliner release pivot 48, disengaging the cam 46 from the edge surface 50 to enable disengagement of the pawl 36 from the sector 42 to enable rotation of the intermediate arm 22 about the primary pivot 24.

The upper end 54 of the sector 42 is coupled to the intermediate arm 22 by sandwiching the sector 42 between a bushing 56 and a dump cam 58. The dump cam 58 is rotatably mounted to the intermediate arm 22 by a pivot 60. In the lock position, the dump cam 58 engages a rear surface 62 of the sector 42 at the upper end of the sector, holding the sector 42 against the bushing 56, thereby coupling the sector to the intermediate arm 22. Thus, the intermediate arm 22 is held in the adjusted position of the sector 42.

The seat back 16 is rotated to a forward dump easy entry position by rotating the pivot 60 in a clockwise motion, lifting the dump cam 58 above the upper end 54 of the sector 42. This releases the intermediate arm 22 from the sector 42 and allows the intermediate arm 22 to rotate forward relative to the sector 42. The dump position of the intermediate arm 22 is shown in FIG. 5. One plate 26 of the intermediate arm 22 includes a radial stop edge 66. The stop edge 66 engages a tab 68 formed in one of the plates 20 of the mounting member 18 to limit the forward rotation of the intermediate arm 22 in the dump position.

The dump pivot 60 can be actuated by a handle (not shown) mounted directly to the pivot 60. Alternatively, the dump cam 58 can be actuated remotely via a cable (not shown) having an end attached to a cable mounting tab 70 formed in the intermediate arm 22 adjacent the dump cam 58. Either form of actuating the dump cam is known within vehicle seating art. Upon return of the seat back 16 from the forward dump position, the lower edge 72 of the dump cam 58 will ride over the upper end 54 of the sector 42 until the dump cam has moved rearward of the sector at which point the dump cam 58 returns to its lock position. The dump cam 58 is biased to its lock position by a spring 74 attached to the pivot 60 (FIG. 2).

The upper arm 28 is held in place about the secondary pivot 30 by an upper arm latch 76. The upper arm latch 76 includes a latch cam 78 rotatably mounted to the intermediate arm 22 by a pivot 80. The latch cam 78 has distal end edge surface 82 which engages a somewhat radially extending cam surface 84 of the upper arm 28 to hold the upper arm 28 in a fixed position about the secondary pivot 30. A stop bushing 86 travels through an arcuate slot 88 in the upper arm 28 and defines the range of motion of the upper arm 28 about the secondary pivot 30. The latch cam 78 holds the upper arm 28 in a position where the end of the slot 88 bears against the stop bushing 86. The upper arm 28 is thus held from rotation about the secondary pivot 30.

The latch cam 78 has a hook 89 at its distal end having a hook edge surface 90. As the upper arm 28 rotates to the fold flat position, the hook edge surface 90 slides along a dwell zone surface 92 on the edge of the upper arm 28. At the end of the dwell zone surface 92, the edge of the upper arm is formed with a latching notch 94. The hook 89 seats into the notch 94 when the upper arm 28, and hence the seat back 16, is in the fold flat position. This locks the seat back 16 in the fold flat position both during vehicle operation and also when the seat 12 is removed from the vehicle to facilitate handling of the seat 12. The latch cam 78 is biased to the lock position against the cam surface 84 and into the notch 94 by the spring 95 shown in FIGS. 1 and 2.

The upper arm latch 76 is released by actuation of the recliner release pivot 48 as described as follows. A crank 96 is carried by the pivot 80 to rotate the pivot 80 and the latch cam 78. The crank 96 is attached at its distal end to a pivot bracket 98. The pivot bracket 98 is rotatable upon the primary pivot 24. The crank 96 is coupled to the pivot bracket 98 via a pin 100 on the crank 96 extending through a slot 102 in the pivot bracket 98. The spring 95 on the pivot 80 biases the crank 96 and latch cam 78 into a locked position in which the latch cam 78 engages the cam surface 84 of the upper arm. This holds the pivot bracket 98 in a predetermined position about the primary pivot 24. The pivot 80 moves with the intermediate arm 22 as the intermediate arm rotates about the primary pivot 24 when the recline position of the seat back is adjusted, thus maintaining the angular position of the crank 96 relative to the pivot bracket 98. The pivot bracket 98 has a tab 104 protruding axially from the side of the pivot bracket 98. The tab 104 interacts with a slide link 106 to release the upper latch 76.

The slide link 106 is mounted to a pin 108 fixed to one of the plates 20 of the mounting member 18. The slide link 106 has a slot 110 approximately in the middle of the slide link 106 within which the pin 108 is disposed. The slide link 106 has one end 112 which is rotatably connected to an actuating link 114 by a pin 116. The actuating link 114 is fixed to the recliner release pivot 48 for rotation therewith. When the recliner release pivot 48 is rotated clockwise as viewed in the figures, to release the recliner, the pin 116 is initially moved in a direction primarily rearward. This causes the slide link 106 to translate and move along the pin 108. As the recliner release pivot 48 continues to rotate, the pin 116 of the actuating link 114 begins to move more so in the downward direction, causing the slide link 106 to rotate counterclockwise about the pin 108. The slide link 106 is shown in FIG. 5 in the position corresponding to the lock position of the recliner 34. In FIGS. 3 and 4, the slide link is shown in an actuated position corresponding to the recliner release position.

With reference to FIG. 3, the slide link 106 is in the actuated position in which the slide link end 118 has moved close enough to the primary pivot 24 that the protruding tab 104 on the pivot bracket will engage the slide link 106 as the intermediate arm 22 rotates forward toward the foremost recline position. The contact between the tab 104 and the slide link 106 occurs before the foremost recline position is reached. The contact between the pivot bracket 98 and the slide link 106 causes the pivot bracket 98 to stop rotating about the primary pivot 24. However, the intermediate arm 22 continues to rotate about the primary pivot 24. As the intermediate arm continues to rotate, the pivot 80 also moves with the intermediate arm 22. Since the pivot bracket 98 is held in place, this causes relative movement between the pivot bracket 98 and the crank 96. This rotates the pivot 80 about its axis, withdrawing the latch cam 78 from its engaged position with the cam surface 84 of the upper arm 28. The change in relative positions in the crank 96 and pivot bracket 98 is shown by comparing their relative positions in FIGS. 3 and 4.

In FIG. 4, the seat back is in its foremost recline position. In this position, the rear edge surface 120 of the sector 42 engages a stop 122 to limit further forward rotation of the sector and the intermediate arm 22. At this point, if the recliner release pivot 48 is allowed to return to the recliner lock position in which the pawl 36 engages the sector 42, the slide link 106 will be withdrawn from the tab 104. This allows the latch cam 78 to return to its latched position engaging the cam surface 84 of the upper arm 28 thus holding the upper arm 28 fixed about the secondary pivot 30.

However, if the seat back 16 is being rotated to the fold flat position, the recliner release pivot 48 stays in the release position when the seat back 16 reaches the foremost recline position. The intermediate arm remains in the foremost recline position while the upper arm 28 rotates about the secondary pivot 30. The latch cam 78 passes over the dwell zone surface 92 of the upper arm as the upper arm rotates forward. Release of the recliner release pivot 48 at this point allows the recliner 34 to return to the lock position. The latch cam 78 will engage the dwell zone surface 92 and slide over the dwell zone as the upper arm rotates to the fold flat position. Once the upper arm is in the fold flat position, shown in phantom line in FIG. 4, the hook 89 of the latch cam 78 seats in the notch 94 to hold the seat back 16 in the fold flat position.

If the seat back is in the foremost recline position at the time it is desired to rotate the seat back 16 to the fold flat position, the recliner release pivot 48 is actuated to release the recliner. The movement of the slide link 106 as described above, moves the slide link end 118 first beneath the lower end of the tab 104 by the initial translation of the slide link 106 rearward. The later counterclockwise rotation of the slide link 106 engages the slide link with the tab 104 causing the pivot bracket 98 to rotate about the primary pivot 24 relative to the intermediate arm 22. This rotation of the pivot bracket causes the latch cam 78 to disengage the upper arm 28, thereby allowing the upper arm and seat back to rotate about the secondary pivot 30 to the fold flat position.

With reference to FIG. 5, the seat back is in the forward dump easy entry position in which the intermediate arm 22 have been released from the sector 42 enabling the seat back to rotate forward even though the sector 42 remains in its adjusted, recline position. In this forward rotated position, the tab 104 is generally rearward of the slide link 106. The rearward movement of the slide link 106 upon actuation of the recliner release pivot 48 causes the slide link 106 to engage the tab 104 prior to complete release of the recliner. This engagement prevents further rotation of the recliner release pivot 48 thus forming a lock out to prevent release of the recliner 34 when the seat back 16 is in the forward dump position. While the engagement between the pivot bracket 98 and the slide link 106 occurs by provision of the axial extending protrusion in the form of a tab 104, it will be appreciated that the same function can be achieved by engagement of the slide link 106 with the edge of the pivot bracket if the slide link 106 is aligned in the same plane as the pivot bracket and the pivot bracket has an appropriate edge contour.

There is no lock out feature to prevent release of the dump cam 58 when the seat back is in the fold flat position. However, release of the dump cam with the seat back in the fold flat position is ineffective to cause any movement of the adjusting mechanism. This is a result of the seat back 16 resting upon the seat bottom 14. Thus, even if the dump cam 58 is actuated to the release position, there will be no movement of the seat back relative to the seat bottom and thus no movement of the adjusting mechanism components.

Figure 6:
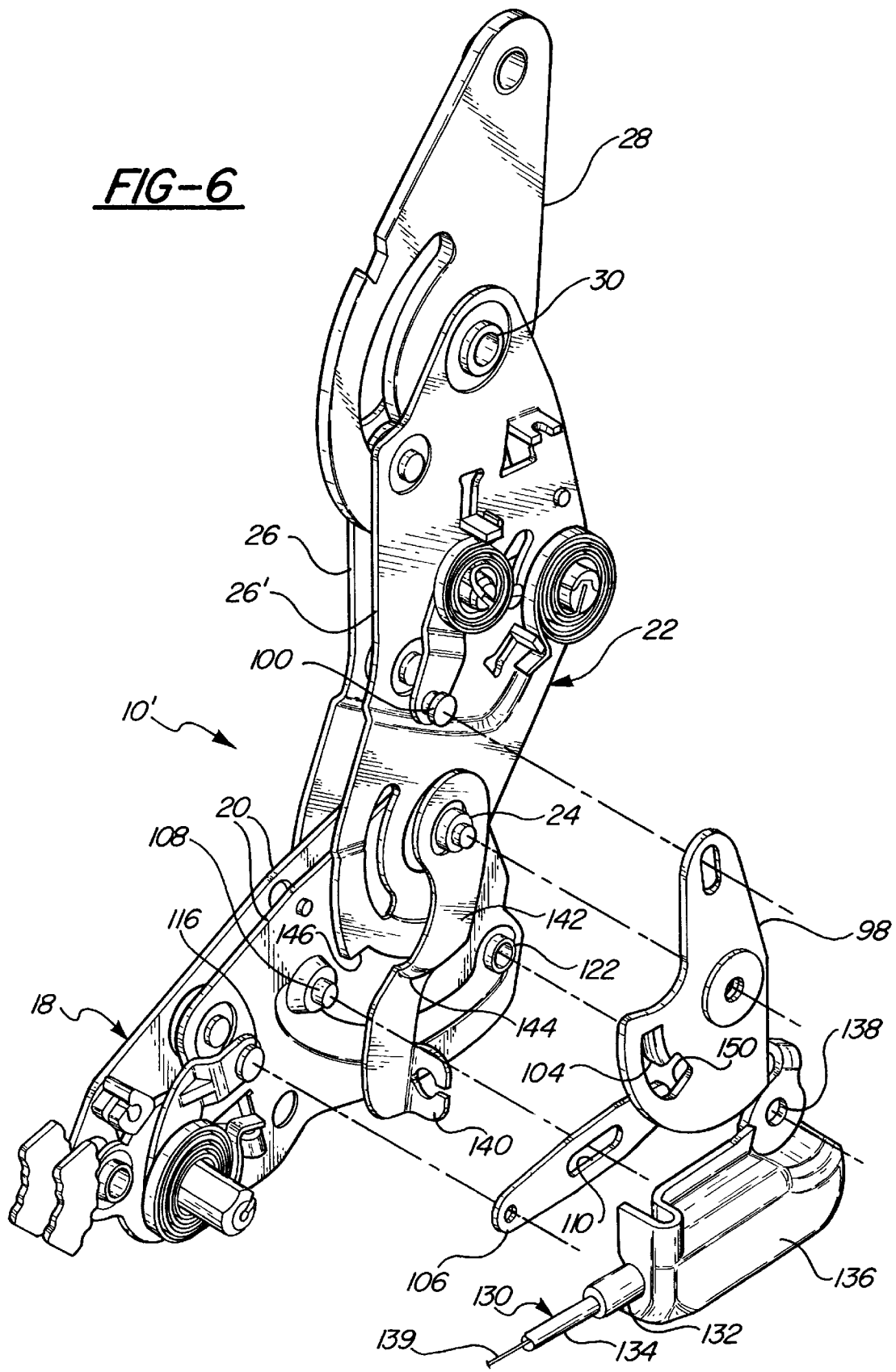
FIG. 6 is an exploded perspective view of an alternative embodiment of the adjusting mechanism of the present invention including a cable actuator to release the fore and aft adjuster upon rotation of the seat back to a forward dump easy entry position.

With reference to FIG. 6, an alternative embodiment of the adjusting mechanism of the present invention is shown and designated at 10'. The adjusting mechanism 10' includes a cable actuator for releasing the seat fore and aft adjuster (not shown) upon rotation of the seat back to the forward dump easy entry position shown in FIG. 5. The seat back is moved to the forward dump easy entry position by rotation of the intermediate arm 22 about the primary pivot 24. Access to a rear seating area in a vehicle is improved by not only rotating the seat back to the forward dump easy entry position but also releasing the seat fore and aft adjuster to enable the entire seat 12 to move forward relative the vehicle body.

Release of the fore and aft adjuster is accomplished by a Bowden cable 130. One end 132 of the Bowden cable 130 is shown in FIG. 6. The cable 130 includes a sheath or housing 134 which is fixed to the mounting bracket 136. The mounting bracket 136 is in turn fastened to the mounting member 18 by the stop 122 extending through an aperture 138 in the bracket 136 and having an upset end. Alternatively, a fastener such as a rivet can be inserted through the aperture 138 and through the center of the stop 122. The Bowden cable 130 includes a pull wire 139 having an end which is operatively coupled to the wire mounting flange 140 at the lower end of a dogleg bracket 142. The dogleg bracket 142 is mounted to the primary pivot 24 and extends downwardly therefrom. The dogleg bracket 142 is adjacent to the plate 26' of the intermediate arm 22. The slide link 106 and pivot bracket 98 overlie the dogleg bracket 142 on the opposite side from the plate 26'.

The dogleg bracket 142 includes an inwardly bent portion 144 approximately midway between the primary pivot 24 and the wire mounting flange 140. The inwardly bent portion 144 moves the lower portion of the dogleg bracket 142 into the same plane as the plate 26'. The plate 26' includes a radially extending shoulder 146 which, when the intermediate arm 22 is rotated about the primary pivot 24 to the forward dump easy entry position, will contact the dogleg bracket 142. Continued rotation of the plate 26' causes the dogleg bracket 142 to rotate about the primary pivot 24. The dogleg bracket 142 rotates counterclockwise as the seat back is dumped forward causing the wire mounting flange 140 to move rearward, pulling the wire 139 of the Bowden cable 130. The opposite end of the wire 139 is coupled to the fore and aft seat adjuster to release the adjuster upon pulling of the Bowden cable. The inclusion of the dogleg bracket 142 enables the seat adjuster to be released upon rotation of the seat back to the forward dump easy entry position but does not release the fore and aft adjuster when the seat back is rotated about the secondary pivot 30 to the fold flat position.

In the embodiment shown in FIG. 6, the tab 104 in pivot bracket 98 is formed by a punch producing an opening 150 in the pivot bracket and bending a flange to form the tab 104.

The adjusting mechanism 10 of the present invention provides for recliner adjustment of the seat back, rotation of the seat back to a forward dump easy entry position and rotation of the seat back to a fold flat position for storage. In the fold flat position the seat back is locked in place. A single actuating handle is operated to adjust the recline position of the seat back and to rotate the seat back to the fold flat position. A second handle is actuated to rotate the seat back to a forward dump position in which the seat back is unlocked. Upon return of the seat back from the dump position, the seat back locks in the previously adjusted recline position.

It is to be understood that the invention is not limited to the exact construction illustrated and described above, but that various changes and modifications may be made without departing from the spirit and scope of the invention as defined in the following claims.

What is claimed is:

1. A vehicle seat comprising:
   a generally horizontal seat bottom having a rear end;
   a seat back extending upwardly from said rear end of said seat bottom;
   a seat back adjusting mechanism mounting said seat back to said seat bottom for rotation about a primary pivot to adjust said seat back within a range of recline positions between a foremost recline position and a rearmost recline position and for rotation about said primary pivot forward beyond said foremost recline position to a forward dump easy entry position;
   said adjusting mechanism further having a secondary pivot displaced from said primary pivot about which said seat back rotates from said foremost recline position to a generally horizontal fold flat position;
   said adjusting mechanism including a recliner operable to hold said seat back in an adjusted position within said range of recline positions when engaged, said recliner being releasable to adjust said seat back position, a dump latch releasable to enable said seat back to rotate to said forward dump easy entry position and an upper latch operable to hold said seat back fixed about said secondary pivot when engaged, said upper latch being releasable to rotate said seat back about said secondary pivot to said fold flat position; and
   said adjusting mechanism including a recliner release pivot actuatable to release said recliner and an upper latch release mechanism coupling said recliner release pivot to said upper latch and being operable to release said upper latch, wherein said upper latch release mechanism includes a first linkage connected to said recliner release pivot and a second linkage connected to said upper latch, said first and second linkages engaging one another when said recliner release pivot is actuated and said seat back rotates forward about said primary pivot to said foremost recline position to release said upper latch.

2. The seat as defined by claim 1 further comprising a dump latch release pivot actuatable to release said dump latch.

3. The seat as defined by claim 1 further comprising a lock-out to prevent release of said recliner when said seat back is in said forward dump easy entry position.

4. The seat as defined by claim 1 wherein said recliner includes a lock-upper coupled to said seat back by said dump latch and releasable by said dump latch to enable said seat back to rotate to said dump position while said recliner remains engaged.

5. The seat as defined by claim 1 wherein said second linkage has an engagement surface engaged by said first linkage to release said upper latch.

6. The seat as defined by claim 5 wherein said first linkage engages said engagement surface of said second linkage when said recliner release pivot is actuated and said seat back is rotated to said foremost recline position.

7. The seat as defined by claim 5 further comprising a lock-out to prevent release of said recliner when said seat back is in said forward dump easy entry position, said lock-out being formed by movement of said engagement surface of said second linkage when said seat back is moved to said forward dump easy entry position to an interference position with respect to said first linkage to prevent actuation of said recliner release pivot.

8. The seat as defined by claim 1 wherein said upper latch is operable to lock said seat back in said generally horizontal fold flat position.

9. The seat as defined by claim 8 wherein said upper latch is released by actuation of said recliner release pivot to enable said seat back to rotate rearward from said generally horizontal fold flat position to said foremost recline position.

10. The seat as defined by claim 1 further comprising a cable actuator operable upon rotation of said seat back to said forward dump easy entry position to pull a cable.

11. A vehicle seat comprising:
   a generally horizontal seat bottom having a rear end;
   a seat back extending upwardly from said rear end of said seat bottom;
   a seat back adjusting mechanism mounting said seat back to said seat bottom, said adjusting mechanism including:
   a lower mounting member fixed to said seat bottom;
   an intermediate arm mounted to said mounting member for rotation about a primary pivot;
   a recliner operatively associated with said lower mounting member and said intermediate arm, said recliner being engagable to lock said intermediate arm in an adjusted position relative to said lower mounting member, said recliner being selectively releasable to enable adjustment of said intermediate arm within a range of adjusted positions between a foremost recline position and a rearmost recline position;
   a recliner release pivot mounted to said lower mounting member and coupled to said recliner, said recliner release pivot being actuatable to release said recliner for adjustment of said intermediate arm relative to said lower mounting member;
   an upper arm mounted to said intermediate arm for rotation about a secondary pivot, said seat back being fixed to said upper arm for movement therewith;
   an upper arm latch engagable to hold said upper arm in an upright position relative to said intermediate arm, said upper arm latch being releasable to rotate said upper arm forward about said secondary pivot to a seat back fold flat position; and an upper arm latch release means coupled to said upper arm latch and said recliner release pivot for releasing said upper arm latch when said recliner is released and said intermediate arm is rotated forward to said foremost recline position to enable said upper arm to rotate to about said secondary pivot to said seat back fold flat position.

12. The seat as defined by claim 11 wherein said recliner includes a lock-upper coupled to said intermediate arm and further comprising dump means for selectively decoupling said recliner from said intermediate arm to enable said intermediate arm to rotate about said primary pivot to a forward dump easy entry position without release of said recliner.

13. The seat as defined by claim 12 wherein said upper arm latch release means includes a lockout to prevent release of said recliner when said intermediate arm is in said forward dump easy entry position.

14. The seat as defined by claim 12 further comprising a cable actuator operable upon rotation of said seat back to said forward dump easy entry position to pull a cable wire.

15. The seat as defined by claim 14 wherein said cable actuator includes a cable actuator bracket rotationally mounted to said primary pivot and operatively coupled to said wire to pull said wire upon rotation of said bracket.

16. The seat as defined by claim 15 wherein said intermediate arm contacts said cable actuator bracket upon rotation of said intermediate arm to said forward dump easy entry position to rotate said cable actuator bracket.

17. The seat as defined by claim 11 wherein said upper arm latch is operable to lock said upper arm in said fold flat position.

18. The seat as defined by claim 11 wherein said upper arm latch includes an upper arm latch cam mounted to said intermediate arm by a cam pivot to engage with a generally radially extending edge of said upper arm to hold said upper arm in place relative to said intermediate arm;

said upper arm latch release means including a release crank attached to said cam pivot to rotate said cam pivot and said upper arm latch cam;

a pivot bracket rotatable about said primary pivot and connected to a distal end of said release crank and said pivot bracket having an engagement surface;

bias means for holding said upper arm latch cam in a latched position and the crank and pivot bracket in latched positions relative to one another; and a slide link coupled to the recliner release pivot and movable into a path of travel of said engagement surface to engage said engagement surface as said intermediate arm moves forward to said foremost recline position to prevent further rotation of said pivot bracket whereby as said intermediate arm continues to rotate, said upper arm latch cam is rotated to a release position and said upper arm is free to rotate to said fold flat position.

19. The seat as defined by claim 18 wherein return of said recliner to a lock position disengages said slide link from said pivot bracket engagement surface allowing said pivot bracket to rotate about said primary pivot and return said upper arm latch cam to a lock position.

20. The seat as defined by claim 19 wherein said upper arm latch cam lockingly engages said upper arm when said upper arm is in said fold flat position and said recliner is engaged.

21. The seat as defined by claim 20 wherein when said upper arm is in said fold flat position and said recliner release pivot is actuated, said slide link re-engages said engagement surface of said pivot bracket to rotate said pivot bracket whereby said upper arm latch cam is moved to a release position to unlock said upper arm to enable said upper arm to return to an upright position relative to said intermediate arm.

22. The seat as defined by claim 18 wherein said upper arm latch cam is engagable with a circumferential edge surface of said upper arm as said upper arm rotates from said foremost recline position to said fold flat position.

23. A vehicle seat comprising:

a generally horizontal seat bottom;

a seat back extending substantially upwardly from said seat bottom;

a seat back adjusting mechanism in communication with said seat back and said seat bottom, said seat back adjusting mechanism being operable to rotate said seat back about a primary pivot and a secondary pivot displaced from said primary pivot to at least one of at least one adjusted position, a generally forward dump easy entry position, and a generally horizontal fold flat position, said seat back adjusting mechanism including, a recliner operable to releasably hold said seat back in said at least one adjusted position, a dump latch operable to enable said seat back to rotate to said generally forward dump easy entry position, an upper latch operable to releasably hold said seat back fixed about said secondary pivot and allow rotation of said seat back about said secondary pivot to said fold flat position, and a recliner release pivot operable to release said recliner and said upper latch, wherein said upper latch is released by actuation of said recliner release pivot to enable said seat back to rotate from said generally horizontal fold flat position to said at least one adjusted position.

24. The seat as defined by claim 23, wherein said seat back adjusting mechanism includes an upper latch release mechanism coupling said recliner release pivot to said upper latch and being operable to release said upper latch.

25. The seat as defined by claim 24, wherein said upper latch release mechanism includes a first linkage connected to said recliner release pivot and a second linkage connected to said upper latch, said first and second linkages engaging one another when said recliner release pivot is actuated and said seat back rotates forward about said primary pivot to said at least one adjusted position to release said upper latch.

26. The seat as defined by claim 25 wherein said second linkage has an engagement surface engaged by said first linkage to release said upper latch.

27. The seat as defined by claim 26 wherein said first linkage engages said engagement surface of said second linkage when said recliner release pivot is actuated and said seat back is rotated to said at least one adjusted position.

28. The seat as defined by claim 26 further comprising a lock-out to prevent release of said recliner when said seat back is in said forward dump easy entry position, said lock-out being formed by movement of said engagement surface of said second linkage when said seat back is moved to said forward dump easy entry position to an interference position with respect to said first linkage to prevent actuation of said recliner release pivot.

\* \* \* \* \*